(12) United States Patent
Murase (10) Patent No.: US 11,407,102 B2
(45) Date of Patent: Aug. 9, 2022

(54) GRASPING ROBOT AND CONTROL PROGRAM FOR GRASPING ROBOT

(71) Applicant: Toyota Jidosha Kabushiki Kaisha, Toyota (JP)

(72) Inventor: Kazuto Murase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 16/693,993

(22) Filed: Nov. 25, 2019

(65) Prior Publication Data

US 2020/0164507 A1   May 28, 2020

(30) Foreign Application Priority Data

Nov. 27, 2018   (JP) .............................. JP2018-221337

(51) Int. Cl.
*B25J 9/16* (2006.01)
*B25J 19/04* (2006.01)

(52) U.S. Cl.
CPC .............. *B25J 9/1612* (2013.01); *B25J 9/163* (2013.01); *B25J 9/1669* (2013.01); *B25J 9/1697* (2013.01); *B25J 19/04* (2013.01)

(58) Field of Classification Search
CPC ........ B25J 9/1612; B25J 9/163; B25J 9/1697; B25J 9/1669; B25J 19/04; B25J 9/04;
(Continued)

(56) References Cited

U.S. PATENT DOCUMENTS

| | | | |
|---|---|---|---|
| 7,515,990 B2* | 4/2009 | Sato ..................... | G05D 1/0238 700/262 |
| 8,022,812 B2* | 9/2011 | Beniyama ............ | G05D 1/0261 340/572.1 |

(Continued)

FOREIGN PATENT DOCUMENTS

JP        2014-228879 A      12/2014

OTHER PUBLICATIONS

Pangercic et al, Semantic Object Maps for Robotic Housework—Representation, Acquisition and Use, 2012, IEEE/RSJ International Conference on Intelligent Robots and Systems, Oct. 7-12, 2012. Vilamoura, Algarve, Portugal, pp. 4644-4651 (Year: 2012).*

(Continued)

*Primary Examiner* — Jaime Figueroa
(74) *Attorney, Agent, or Firm* — Dinsmore & Shohl LLP (57) ABSTRACT

A grasping robot includes: a grasping mechanism configured to grasp a target object; an image-pickup unit configured to shoot a surrounding environment; an extraction unit configured to extract a graspable part that can be grasped by the grasping mechanism in the surrounding environment by using a learned model that uses an image acquired by the image-pickup unit as an input image; a position detection unit configured to detect a position of the graspable part; a recognition unit configured to recognize a state of the graspable part by referring to a lookup table that associates the position of the graspable part with a movable state thereof; and a grasping control unit configured to control the grasping mechanism so as to displace the graspable part in accordance with the state of the graspable part recognized by the recognition unit.

7 Claims, 6 Drawing Sheets

(58) Field of Classification Search
CPC ........ B25J 5/007; B25J 11/0005; B25J 9/161; B25J 9/1661; G05B 2219/39484; G05B 2219/39536; G05B 2219/39542; G05B 2219/39543
USPC ................................................. 700/245–264
See application file for complete search history.

(56) References Cited

U.S. PATENT DOCUMENTS

| | | | | |
|---|---|---|---|---|
| 8,781,629 | B2* | 7/2014 | Ota | B25J 9/1671 |
| | | | | 700/259 |
| 9,463,575 | B2* | 10/2016 | Shimizu | B25J 9/1679 |
| 10,350,755 | B2* | 7/2019 | Wagner | B25J 9/1694 |
| 10,576,635 | B2* | 3/2020 | Ogawa | B25J 5/007 |
| 10,596,700 | B2* | 3/2020 | Corkum | B25J 9/0081 |
| 10,800,033 | B2* | 10/2020 | Yamada | B25J 15/0071 |
| 11,106,967 | B2* | 8/2021 | Shankar | B25J 9/161 |
| 2006/0047361 | A1* | 3/2006 | Sato | B25J 5/007 |
| | | | | 700/245 |
| 2014/0214208 | A1* | 7/2014 | Shimizu | B25J 9/1697 |
| | | | | 700/259 |
| 2016/0167227 | A1* | 6/2016 | Wellman | B25J 9/1612 |
| | | | | 700/259 |
| 2016/0167228 | A1* | 6/2016 | Wellman | B25J 9/1697 |
| | | | | 700/218 |
| 2016/0279791 | A1* | 9/2016 | Watanabe | G06K 9/00201 |
| 2017/0021499 | A1* | 1/2017 | Wellman | B65G 1/1378 |
| 2017/0225330 | A1* | 8/2017 | Wagner | B25J 15/0616 |
| 2017/0282363 | A1* | 10/2017 | Yamada | B25J 9/1612 |
| 2018/0068158 | A1* | 3/2018 | Hiroi | G06K 9/00013 |
| 2018/0126553 | A1* | 5/2018 | Corkum | B25J 9/1697 |
| 2018/0272535 | A1* | 9/2018 | Ogawa | B25J 9/1692 |
| 2019/0005374 | A1* | 1/2019 | Shankar | B25J 9/161 |
| 2019/0126471 | A1* | 5/2019 | Kobayashi | B25J 9/1669 |
| 2019/0184554 | A1* | 6/2019 | Yamazaki | B25J 9/1697 |

OTHER PUBLICATIONS

Ciocarlie et al, Mobile Manipulation Through An Assistive Home Robot, 2012 IEEE/RSJ International Conference on Intelligent Robots and Systems Oct. 7-12, 2012. Vilamoura, Algarve, Portugal, pp. 5313-5320 (Year: 2012).*

Srinivasa et al, HERB: a home exploring robotic butler, 2009, Springer, Auton. Robots 28, 1 (Jan. 2010), 5-20. DOI:https://doi.org/10.1007/s10514-009-9160-9 (Year: 2009).*

* cited by examiner

GRASPING ROBOT AND CONTROL PROGRAM FOR GRASPING ROBOT

CROSS REFERENCE TO RELATED APPLICATIONS

This application is based upon and claims the benefit of priority from Japanese patent application No. 2018-221337, filed on Nov. 27, 2018, the disclosure of which is incorporated herein in its entirety by reference.

BACKGROUND

The present disclosure relates to a grasping robot and a control program for a grasping robot.

A technique for acquiring, with the lapse of time, data on the movement of a target object including a movable part and recognizing its three-dimensional shape is known (e.g., Japanese Unexamined Patent Application Publication No. 2014-228879).

SUMMARY

When a movable target object is made displaced by a robot hand, it is desired that a robot hand quickly grasp a graspable part of a movable target object and start a displacement operation without recognizing the whole three-dimensional shape.

The present disclosure provides a grasping robot capable of quickly grasping a graspable part of a movable target object and starting a displacement operation.

A first exemplary aspect is a grasping robot, including: a grasping mechanism configured to grasp a target object; an image-pickup unit configured to shoot a surrounding environment; an extraction unit configured to extract a graspable part that can be grasped by the grasping mechanism in the surrounding environment by using a learned model that uses an image acquired by the image-pickup unit as an input image; a position detection unit configured to detect a position of the graspable part; a recognition unit configured to recognize a state of the graspable part by referring to a lookup table that associates the position of the graspable part with a movable state thereof; and a grasping control unit configured to control the grasping mechanism so as to displace the graspable part in accordance with the state of the graspable part recognized by the recognition unit. By using a learned model and a lookup table in combination as described above, it is possible to quickly grasp a graspable part of a movable target object and start a displacement operation.

In the aforementioned grasping robot, the lookup table may associate the graspable part with a movable part of which the movable state is defined. Using the lookup table described above can enable a displacement operation to be quickly started even when a movable part different from a grasping part moves together with the grasping part.

Another exemplary aspect is a control program for a grasping robot including a grasping mechanism configured to grasp a target object, the control program causing a computer to execute: an image-pickup step of shooting an surrounding environment; an extraction step of extracting a graspable part that can be grasped by the grasping mechanism in the surrounding environment by using a learned model that uses an image acquired in the image-pickup step as an input image; a position detection step of detecting a position of the graspable part; a recognition step of recognizing a state of the graspable part by referring to a lookup table that associates the position of the graspable part with a movable state thereof; and a grasping control step of controlling the grasping mechanism so as to displace the graspable part in accordance with the state of the graspable part recognized by the recognition step. A grasping robot controlled by the control program described above can quickly grasp a graspable part of a movable target object and start a displacement operation like the grasping robot according to the first aspect does.

The present disclosure can provide a grasping robot capable of quickly grasping a graspable part of a movable target object and starting a displacement operation.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
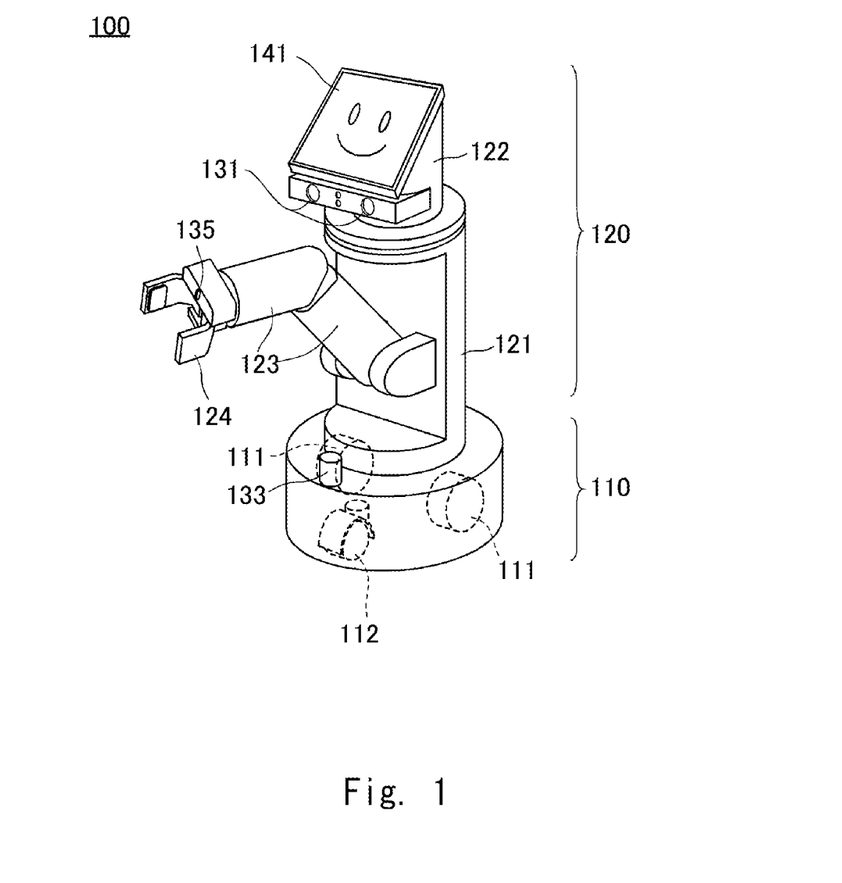
FIG. 1 is an external perspective view showing a mobile robot including a grasping mechanism.

FIG. 1 is an external perspective view showing a mobile robot 100 including a grasping mechanism for grasping a target object. The mobile robot 100 is an example of a grasping robot. The mobile robot 100 includes, mainly, a movable base part 110 and a main-body part 120. The movable base part 110 supports two driving wheels 111 and a caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

The movable base part 110 includes a laser scanner 133 in a peripheral part of its top surface. The laser scanner 133 scans a certain range on the horizontal plane at intervals of a certain stepping angle and outputs information as to whether or not there is an obstacle in each direction. Further, when there is an obstacle, the laser scanner 133 outputs a distance to the obstacle.

The main-body part 120 includes, mainly, a body part 121 mounted on the top surface of the movable base part 110, a head 122 placed on the top surface of the body part 121, an arm 123 supported on the side surface of the body part 121, and a hand 124 disposed at the tip of the arm 123. A hand camera 135 that detects a position of a target object to be grasped is provided in the wrist of the hand 124. The arm 123 and the hand 124 are driven by motors (not shown) and can grasp and displace various target objects in a controlled posture. That is, the arm 123 and the hand 124 function as grasping mechanisms for grasping target objects. The body part 121 can rotate around a vertical axis with respect to the movable base part 110 by a driving force of a motor (not shown).

The head part 122 mainly includes a stereo camera 131 and a display panel 141. The stereo camera 131 has a configuration in which two camera units having the same angle of view are arranged away from each other, and outputs image-pickup signals of images shot by the respective camera units. The stereo camera 131 functions as an image-pickup unit that shoots a surrounding environment.

The display panel 141 is, for example, a liquid crystal display panel, and displays an animated face of a pre-defined character and displays information about the mobile robot 100 in the form of text or by using icons. By displaying the face of the character on the display panel 141, it is possible to impart an impression that the display panel 141 is a pseudo face part to people around the mobile robot 100.

The head part 122 can rotate around a vertical axis with respect to the body part 121 by a driving force of a motor (not shown). Therefore, the stereo camera 131 can shoot a target object located in a desired direction. Further, the display panel 141 can show displayed contents in a desired direction.

Figure 2:
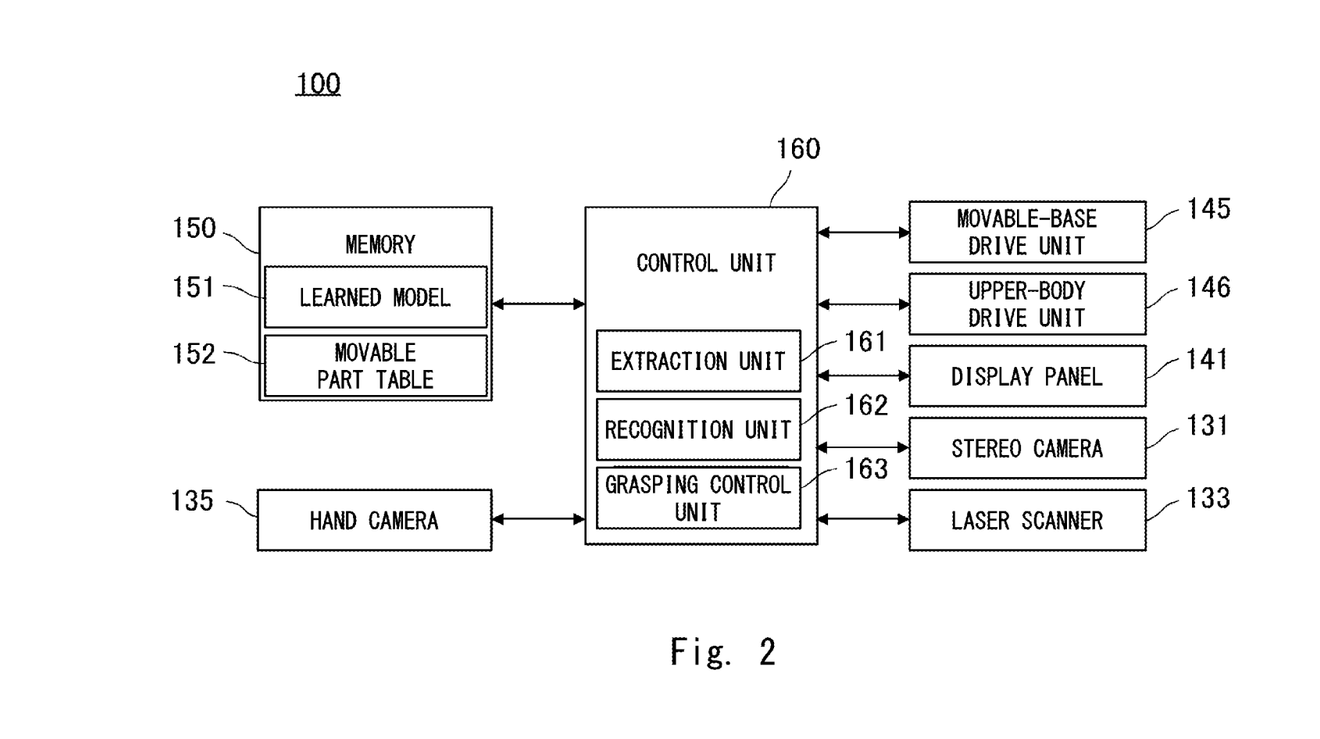
FIG. 2 is a control block diagram of the mobile robot.

FIG. 2 is a control block diagram of the mobile robot 100. Main elements related to a grasping operation for a target object are described hereinafter. However, the mobile robot 100 includes elements in its configuration other than these main elements and may include additional elements that contribute to the process for the grasping operation.

A control unit 160 is, for example, a CPU and is included in, for example, a control box disposed in the body part 121. A movable-base drive unit 145 includes driving wheels 111, and a driving circuit and a motor for driving the driving wheels 111. The control unit 160 performs rotation control of the driving wheels by sending a drive signal to the movable-base drive unit 145. Further, the control unit 160 receives a feedback signal such as an encoder signal from the movable-base drive unit 145 and recognizes a moving direction and a moving speed of the movable base part 110.

An upper-body drive unit 146 includes an arm 123 and a hand 124 as grasping mechanisms, a body part 121, a head part 122, and driving circuits and motors for driving these components. The control unit 160 performs a grasping operation, rotation of the stereo camera 131 in a specific direction, and the like by sending a drive signal to the upper-body drive unit 146. Further, the control unit 160 receives a feedback signal such as an encoder signal from the upper-body drive unit 146, and recognizes positions and moving speeds of the arm 123 and the hand 124, and orientations and rotation speeds of the body part 121 and the head part 122. The display panel 141 displays an image generated by the control unit 160 in accordance with a user's request, etc. Further, as described above, the control unit 160 generates an image signal of the character or the like and displays an image thereof on the display panel 141.

The stereo camera 131 shoots a surrounding environment in accordance with a request from the control unit 160 and passes the image-pickup signal to the control unit 160. The control unit 160 performs image processing using the acquired image-pickup signal. The laser scanner 133 detects whether or not there is an obstacle in the moving direction in accordance with a request from the control unit 160 and passes a detection signal, which is a result of the detection, to the control unit 160.

The hand camera 135 is, for example, a distance image sensor, and is used to recognize a distance, a shape, a direction, and the like of a target object. The hand camera 135 includes an image-pickup device in which pixels for performing a photoelectrical conversion of an optical image incident from a target space are two-dimensionally arranged, and outputs a distance to the subject to the control unit 160 for each of the pixels. Specifically, the hand camera 135 includes an irradiation unit for irradiating a pattern light to the target space, and receives the reflected light of the pattern light by the image-pickup device to output a distance to the subject captured by each of the pixels based on a distortion and a size of the pattern in the image. Note that the control unit 160 recognizes a state of a wide surrounding environment by the stereo camera 131 while it recognizes a state in the vicinity of a specific target object by the hand camera 135. The hand camera 135 functions as a detection unit that detects a position of a graspable part which the grasping mechanism can grasp.

A memory 150 is a nonvolatile storage medium. For example, a solid-state drive is used for the memory 150. The memory 150 stores, in addition to a control program for controlling the mobile robot 100, various parameter values, functions, lookup tables, etc. used for the control and the calculation. In particular, the memory 150 stores a learned model 151 that outputs, from an input image, a graspable area where the grasping mechanism can grasp, and a movable part table 152 that is a lookup table associating a position of the graspable part disposed in the target space with a movable state thereof.

The control unit 160 performs control of the whole mobile robot 100 and various calculation processes by executing a control program read from the memory 150. Further, the control unit 160 functions as a function performing unit that performs various calculations and controls related to the control. An extraction unit 161, a recognition unit 162, and a grasping control unit 163 are included as function performing units described above.

The extraction unit 161, by using an image of the image data generated from one of the image-pickup signals of the stereo camera 131 as an input image, obtains a graspable area from the learned model 151 that is read from the memory 150, and extracts, from the surrounding environment, a graspable part which the grasping mechanism can grasp. The recognition unit 162 recognizes a state of the graspable part to be grasped to execute a task from among the graspable parts extracted by the extraction part 161. More specifically, the recognition unit 162 recognizes a current state of the graspable part based on positional information of the graspable part obtained from the hand camera 135 and information of the graspable part described in the movable part table 152. The grasping control unit 163 defines, in accordance with the given task, how the graspable part is grasped and how the grasped graspable part is displaced considering the state thereof recognized by the recognition unit 162, and sends a drive signal to the upper-body drive unit 146 to control the grasping mechanism in that defined manner.

Figure 3:
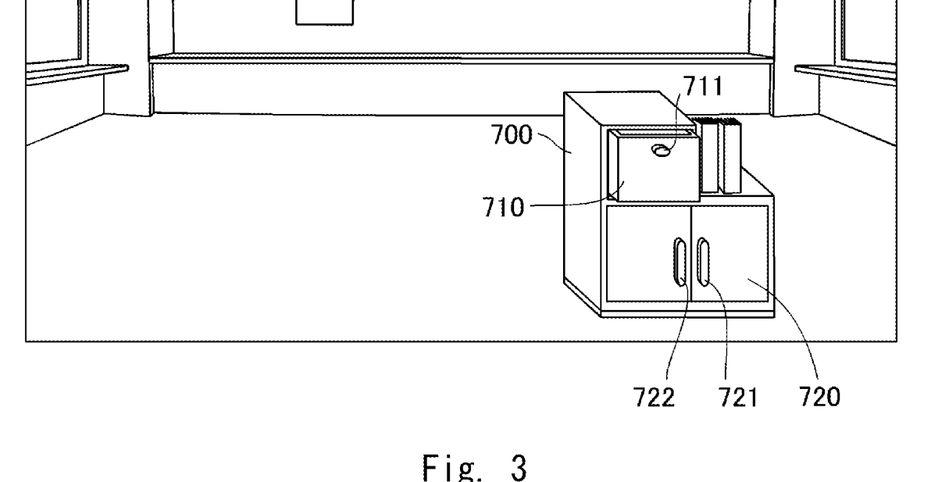
FIG. 3 is an example of a surrounding environment image acquired by the mobile robot.

FIG. 3 is an example of the surrounding environment image which the mobile robot 100 has acquired by the stereo camera 131. The stereo camera 131 includes two camera units, each of which outputs an image-pickup signal, but FIG. 3 shows a two-dimensional image generated from one of the image-pickup signals.

According to this image, there is a cabinet 700 near the mobile robot 100. The cabinet 700 includes a drawer 710 provided with a first knob 711 and a chest 720 provided with a second knob 721 and a third knob 722. The extraction unit 161 gives such an image to the learned model 151 as an input image.

Figure 4:
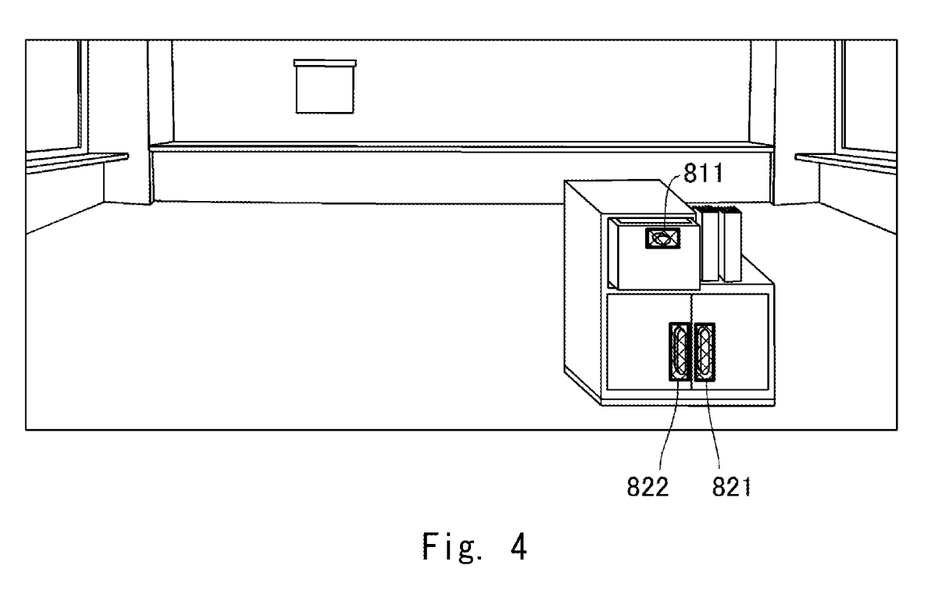
FIG. 4 is an example of a graspable area output by a learned model.

FIG. 4 is an example of a graspable area output by the learned model 151. Specifically, an area surrounding the first knob 711 is detected as a first detected area 811, an area surrounding the second knob 721 is detected as a second detected area 821, and an area surrounding the third knob 722 is detected as a third detected area 822. The learned model 151 is a neural network learned by using a large volume of teaching data, which is a combination of an image showing a graspable part which a hand part that is the grasping mechanism pinches or hooks, and a correct value as to which area of the image is the graspable part. Accordingly, a convex part that can be pinched or a concave part that can be hooked shown in the image may be detected as a graspable area even when it is actually a target object that cannot be displaced. The extraction unit 161 extracts, as a result of the output of the learned model 151, a graspable part which the grasping mechanism can grasp from the surrounding environment. Note that in some embodiments, the learned model 151 is a neural network learned by deep learning.

Figure 5:
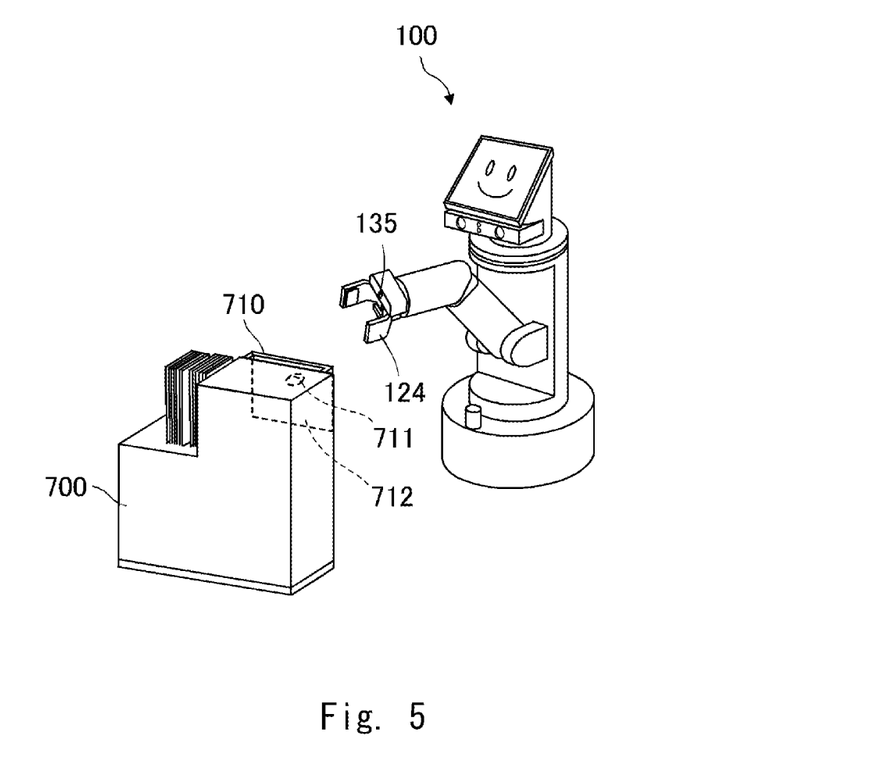
FIG. 5 shows a grasping preparation operation.

FIG. 5 shows a grasping preparation operation performed by the mobile robot 100. The mobile robot 100 has been given a task to be executed in advance, and a displacement operation of the target object is performed as part of the task execution. In this example, a task of grasping a towel housed in the drawer 710 of the cabinet 700 and conveying the towel to a specific location has been given to the mobile robot 100.

The approximate position of the drawer 710 in which the towel is housed is described in the given task in advance. From this positional information, the control unit 160 defines, as a target to be grasped, the first knob 711 present in the vicinity of the drawer 710 from among the graspable parts extracted by the extraction unit 161. Then, as shown in FIG. 5, the control unit 160 drives the arm 123 to a position where the hand camera 135 can observe the first knob 711.

When the driving of the arm 123 is completed, the hand camera 135 shoots a spatial area including the first knob 711. The control unit 160 calculates, from an output signal of the hand camera 135, a distance from the current reference position of the hand 124 to the first knob 711, and a surface direction of a first reference surface 712 to which the first knob 711 is attached.

The recognition unit 162 recognizes the current state of the drawer 710 by checking the calculated distance to the first knob 711 and surface direction of the first reference surface 712 against the information of the first knob 711 described in the movable part table 152. More specifically, the recognition unit 162 recognizes whether the drawer 710 is in a closed state or an opened state, and if it is in an opened state, how wide it is opened. The grasping control unit 163 determines how the first knob 711 is grasped and how much and in which direction the first knob 711 is displaced while it is grasped considering the state of the drawer 710 recognized by the recognition unit 162 or the state of the first knob 711 recognized by the same, and sends a drive signal in accordance with that determination to the upper-body drive unit 146. The amount of displacement is calculated, for example, from a width the drawer is opened allowing the hand 124 to take out a target towel.

Figure 6:
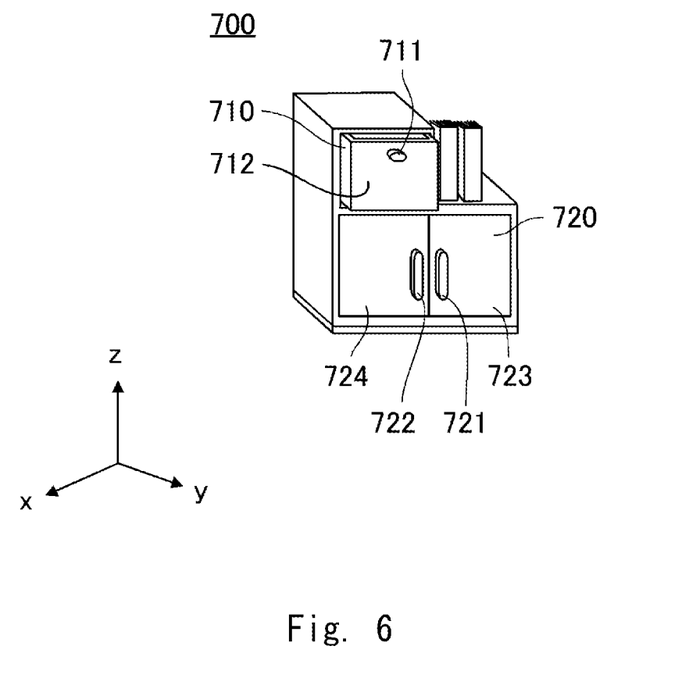
FIG. 6 is a diagram for explaining a definition of a movable object in a movable part table.

FIG. 6 is a diagram for explaining a definition of a movable object in a movable part table 182. Concerning the cabinet 700, the drawer 710 and the chest 720 are defined as movable objects. Regarding the drawer 710, the surface direction (e.g., a surface vector) of the first reference surface 712 to which the first knob 711 is attached, the displaceable direction, and the displaceable range are described using an absolute coordinate system defined for a work space of the mobile robot. Further, a position and an outer shape of the first knob 711 with respect to the first reference surface 712 are described.

Regarding the chest 720, similarly, the surface direction in a closed state of a second reference surface 723 to which the second knob 721 is attached, the rotation axis direction, and the rotatable range are described using the absolute coordinate system. Further, a position and an outer shape of the second knob 721 with respect to the second reference surface 723 are described. Similarly, the surface direction in a closed state of a third reference surface 724 to which the third knob 722 is attached, the rotation axis direction, and the rotatable range are described using the absolute coordinate system. Further, a position and an outer shape of the third knob 722 with respect to the third reference surface 724 are described.

Creating the movable part table 152 described above enables the control unit 160 to quickly recognize a state of a movable target object from the output of the learned model 151 and the output of the hand 124. Accordingly, it is possible to quickly grasp a graspable part and start a displacement operation.

Figure 7:
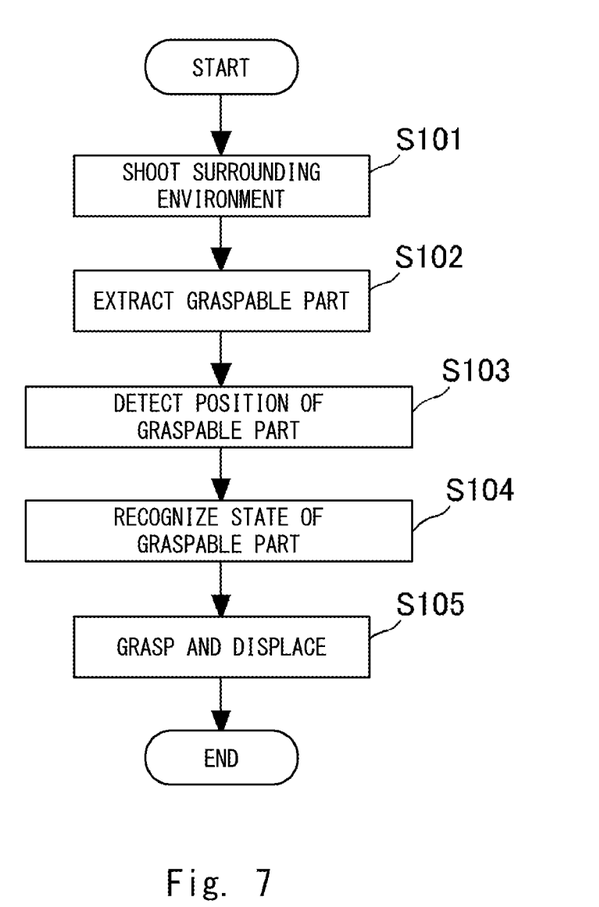
FIG. 7 is a flowchart showing a series of processes of a grasping operation.

FIG. 7 is a flowchart showing a series of processes of a grasping operation. The procedure starts from the point when the mobile robot 100 has moved to the vicinity of the target object to be grasped in accordance with the task to be executed. The control unit performs the following processes by executing a grasping control program read from the memory 150.

In Step S101, the control unit 160 shoots the surrounding environment by the stereo camera 131 to acquire a surrounding environment image. The process proceeds to Step S102, and the extraction unit 161 obtains a graspable area from the learned model 151 read from the memory 150 to extract, from the surrounding environment, a graspable part which the grasping mechanism can grasp.

The process proceeds to Step S103, and the control unit 160 drives the arm 123 to a position where the hand camera 135 can observe the graspable part. Then, the control unit 160 causes the hand camera 135 to shoot the graspable part. The control unit 160 calculates, from an output signal of the hand camera 135, a position of the graspable part and a surface direction of the reference surface to which the graspable part is attached.

The process proceeds to Step S104, and the recognition unit 162 recognizes the current state of the graspable part by checking the position of the graspable part and the surface direction of the reference surface against the information of the graspable part described in the movable part table 152. The process proceeds to Step S105, and the grasping control unit 163 determines how the graspable part is grasped and how much and in which direction the graspable part is displaced while it is grasped considering the state of the graspable part recognized by the recognition unit 162, then sends a drive signal in accordance with that determination to the upper-body drive unit 146. The grasping mechanism grasps and displaces the graspable part in accordance with the drive signal. When the displacement is completed, the series of processes ends.

In the above-described embodiment, a mobile robot 100 including a grasping mechanism has been explained as an example of a grasping robot, but the grasping robot is not limited to such a mobile robot. An arm robot installed in a specific location may be used. Further, a movable part table 152 has been explained as an example of a lookup table associating a position of a graspable part with a movable state thereof, but the form of expressing a movable state is not limited to that of the explained example. A movable state may be expressed using, for example, moving image data instead of using a coordinate system. Further, a hand camera 135 has been explained as an example of a position detection unit that detects a position of a graspable part, but a stereo camera 131 may function as a position detection unit as long as it can detect a position of a grasping part with adequate accuracy for a grasping operation.

Further, in the above-described embodiment, a cabinet 700 has been explained as a movable target object, but obviously a target object that can be moved is not limited to a cabinet. A door that opens and closes can also be a movable target object if the mobile robot 100 opens the door and moves from one side of the divided space to the other side thereof.

Further, a graspable part may not be a part of a movable part. For example, in the case of a structure like an umbrella, an umbrella surface that opens and closes along a shaft part is a movable part with respect to a grasping part which is the shaft part. In such a case, the graspable part and the movable part of which the movable state is defined are described in a lookup table in association with each other. Specifically, it is described how a reference position of the umbrella surface that opens and closes can be displaced with respect to a reference position of the grasping part and how the umbrella surface expands with respect to space. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A grasping robot comprising:
   a grasping mechanism configured to grasp a target object;
   an image-pickup unit configured to shoot a surrounding environment;
   an extraction unit configured to extract a graspable part that can be grasped by the grasping mechanism in the surrounding environment by using a learned model that uses an image acquired by the image-pickup unit as an input image;
   a position detection unit configured to detect a position of the graspable part;
   a recognition unit configured to recognize a state of the graspable part by referring to a lookup table that associates the position of the graspable part with a movable state thereof; and
   a grasping control unit configured to control the grasping mechanism so as to displace the graspable part in accordance with the state of the graspable part recognized by the recognition unit.

2. The grasping robot according to claim 1, wherein the lookup table associates the graspable part with a movable part of which the movable state is defined.

3. A non-transitory computer readable medium storing a control program for a grasping robot comprising a grasping mechanism configured to grasp a target object, the control program causing a computer to execute:
   an image-pickup step of shooting an surrounding environment;
   an extraction step of extracting a graspable part that can be grasped by the grasping mechanism in the surrounding environment by using a learned model that uses an image acquired in the image-pickup step as an input image;
   a position detection step of detecting a position of the graspable part;
   a recognition step of recognizing a state of the graspable part by referring to a lookup table that associates the position of the graspable part with a movable state thereof; and
   a grasping control step of controlling the grasping mechanism so as to displace the graspable part in accordance with the state of the graspable part recognized by the recognition step.

4. The grasping robot according to claim 1, wherein the surrounding environment includes a plurality of objects other than the target object.

5. The grasping robot according to claim 4, wherein the extraction unit is configured to extract the graspable part that can be grasped by the grasping mechanism in the surrounding environment that includes the plurality of objects.

6. The control program of claim 3, wherein the surrounding environment includes a plurality of objects other than the target object.

7. The control program of claim 6, wherein the extraction step is further configured to extract the graspable part that can be grasped by the grasping mechanism in the surrounding environment that includes the plurality of objects.

* * * * *